US010725442B2

(12) United States Patent
Erni

(10) Patent No.: US 10,725,442 B2
(45) Date of Patent: Jul. 28, 2020

(54) METHODS AND APPARATUS TO COMMUNICATIVELY COUPLE ON/OFF VALVES TO CONTROLLERS IN A PROCESS CONTROL SYSTEM

(71) Applicant: Fisher-Rosemount Systems, Inc., Round Rock, TX (US)

(72) Inventor: Klaus Erni, Austin, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 1036 days.

(21) Appl. No.: 14/485,201

(22) Filed: Sep. 12, 2014

(65) Prior Publication Data

US 2016/0076664 A1 Mar. 17, 2016

(51) Int. Cl.
*F16K 31/06* (2006.01)
*G05B 15/02* (2006.01)
*F16K 37/00* (2006.01)

(52) U.S. Cl.
CPC .......... *G05B 15/02* (2013.01); *F16K 37/0075* (2013.01); *F16K 37/0083* (2013.01)

(58) Field of Classification Search
CPC ..... G05B 15/02; F16K 31/06; F16K 37/0075; F16K 37/0083
See application file for complete search history.

(56) References Cited

U.S. PATENT DOCUMENTS 6,035,878 A * 3/2000 Adams ............... G05D 16/2093
137/1
8,332,567 B2 12/2012 Burr et al.
8,493,232 B2 7/2013 Cornwall et al.
(Continued)

FOREIGN PATENT DOCUMENTS

CN 200969047 10/2007
CN 101344789 1/2009
(Continued)

OTHER PUBLICATIONS

Fisher Controls International , "Fieldvue DVC5000f Series Digital Valve Controllers for Foundation Fieldbus" Instruction Manual Oct. 1998, 122 Pgs (Year: 1998).*
(Continued)

*Primary Examiner* — Emilio J Saavedra
(74) *Attorney, Agent, or Firm* — Hanley, Flight & Zimmerman, LLC

(57) ABSTRACT

Methods and apparatus to communicatively couple on/off valves to controllers in a process control system are disclosed. An example apparatus includes a first interface to receive a command signal from a termination module to be communicatively coupled to a controller in a process control system. The command signal is directed to an on/off valve in the process control system. The first interface transmits a feedback signal to the termination module in response to the command signal. The example apparatus also includes a second interface to receive position information from proximity sensors in a switch box monitoring a state of the on/off valve. The feedback signal is based on the position information. The example apparatus further includes a communication processor to be communicatively coupled to the first and the second interfaces to process the command signal and the feedback signal.

11 Claims, 7 Drawing Sheets

(56) References Cited

U.S. PATENT DOCUMENTS

| | | | |
|---|---|---|---|
| 8,762,618 B2 | 6/2014 | Burr et al. | |
| 2003/0033868 A1* | 2/2003 | Posey | F16K 5/0647 73/168 |
| 2003/0043052 A1* | 3/2003 | Tapperson | G05B 19/4185 340/6.1 |
| 2006/0011240 A1* | 1/2006 | Berner | F15B 13/0814 137/554 |
| 2006/0031001 A1 | 2/2006 | Snowbarger et al. | |
| 2008/0126665 A1* | 5/2008 | Burr | G05B 19/042 710/316 |
| 2010/0256784 A1* | 10/2010 | Seberger | G05B 19/44 700/33 |
| 2011/0074602 A1* | 3/2011 | Cornwall | G01D 4/004 340/870.02 |
| 2013/0184837 A1 | 7/2013 | Blevins et al. | |
| 2014/0149630 A1 | 5/2014 | Burr et al. | |

FOREIGN PATENT DOCUMENTS

| | | |
|---|---|---|
| CN | 101508294 | 8/2009 |
| CN | 201569303 | 9/2010 |
| CN | 102393665 | 3/2012 |
| CN | 102607826 | 7/2012 |
| CN | 103339916 | 10/2013 |
| EP | 3450923 | 3/2019 |
| JP | 2005031964 | 2/2005 |
| JP | 2008502997 | 1/2008 |
| JP | 2008077660 | 4/2008 |
| JP | 2014135020 | 7/2014 |

OTHER PUBLICATIONS

Fisher Controls International, "Fieldvue DVC5000 Series Digital Valve Controller" Bulletin 62.1:DVC5000 Jan. 2001, 10 Pgs (Year: 2001).*

Dolan, "Fieldbus Technology in a Biopharmaceutical Facility" Presentation End User Council Meeting, Nov. 2005, 64 Pgs (Year: 2005).*

Flowserve, "User Instructions Logix 520MD—LGENIM0520-01" Apr. 2009, 20 pgs (Year: 2009).*

Flowserve, "Automax Valve Automation Systems Rotary Switches and Positioners" 2006, 24 Pgs (Year: 2006).*

Pepperl+Fuchs , "Manual FDO-VC-Ex4.FF Valve Coupler for Foundation Fieldbus" Feb. 15, 2013, 56 pgs (Year: 2013).*

K Controls Ltd ., "E-training: The application of fieldbus in hazardous areas" 2010, 6 pgs (Year: 2010).*

Max-Air Technologies, Inc., "Max-Air Limit Switches & Position Indication" Feb. 14, 2014, 12 pgs., (Year: 2014).*

Bhatia, "Control Valve Basics: Sizing and Selection" accessed at https://www.cedengineering.com/userfiles/Control%20Valves%20Basics%20-%20Sizing%20&%20Selection.pdf , May 2019, Continuing Education and Development, Inc., 64 Pgs. (Year: 2019).*

"Bray Controls Pneumatic Actuators & Accessories" Bray international, Inc., 2010, 16 Pgs., (Year: 2010).*

Great Britain Intellectual Property Office, "Search Report," issued in connection with application GB1514872.9, dated Feb. 9, 2016, 3 pages.

Emerson Process Management, "FieldQ Valve Actuator", reference manual, Oct. 2006, 36 pages.

Pepperl+Fuchs, "Valve Coupler", Mar. 4, 2013, 5 pages.

State Intellectual Property Office of the People's Republic of China "Search Report," issued in connection with application No. 201510566222.4 dated Feb. 2, 2019, 17 pages.

Japanese Patent Office, "Notice of Reasons for Rejection" issued in connection with Japanese patent application No. 2015-180607 dated Sep. 3, 2019, (10 pages).

Great Britain Intellectual Property Office, "Examination Report" issued in connection with British patent application No. GB1514872.9 dated Feb. 26, 2020, (5 pages).

* cited by examiner

METHODS AND APPARATUS TO COMMUNICATIVELY COUPLE ON/OFF VALVES TO CONTROLLERS IN A PROCESS CONTROL SYSTEM

FIELD OF THE DISCLOSURE

The present disclosure relates generally to process control systems and, more particularly, to methods and apparatus to communicatively couple on/off valves to controllers in a process control system.

BACKGROUND

Process control systems, like those used in chemical, petroleum, pharmaceutical, pulp and paper, or other manufacturing processes, typically include one or more process controllers communicatively coupled to at least one host including at least one operator workstation and to one or more field devices configured to communicate via analog, digital or combined analog/digital communication protocols. The field devices, which may be, for example, device controllers, valves, valve actuators, valve positioners, switches and transmitters (e.g., temperature, pressure, flow rate, and chemical composition sensors) or combinations thereof, perform functions within the process control system such as opening or closing valves and measuring or inferring process parameters. A process controller receives signals indicative of process measurements made by the field devices and/or other information pertaining to the field devices, uses this information to implement a control routine, and generates control signals that are sent over the buses or other communication lines to the field devices to control the operation of the process control system.

A process control system can include a plurality of field devices that provide several different functional capabilities and that are often communicatively coupled to process controllers using two-wire interfaces in a point-to-point (e.g., one field device communicatively coupled to a field device bus) or a multi-drop (e.g., a plurality of field devices communicatively coupled to a field device bus) wiring connection arrangements or with wireless communications. Some field devices are configured to operate using relatively simple commands and/or communications (e.g., an ON command and an OFF command). Other field devices are more complex requiring more commands and/or more communication information, which may or may not include simple commands. For example, more complex field devices may communicate analog values with digital communications superimposed on the analog value using, for example, a Highway Addressable Remote Transducer ("HART") communication protocol. Other field devices can use entirely digital communications (e.g., a FOUNDATION Fieldbus communication protocol).

In a process control system, each field device is typically coupled to a process controller via one or more I/O cards and a respective communication medium (e.g., a two-wire cable, a wireless link, or an optical fiber). Thus, a plurality of communication media are required to communicatively couple a plurality of field devices to a process controller. Often the plurality of communication media coupled to the field devices are routed through one or more field junction boxes, at which point, the plurality of communication media are coupled to respective communication media (e.g., respective two-wire conductors) of a multi-conductor cable used to communicatively couple the field devices to the process controller via one or more I/O cards.

SUMMARY

Example methods and apparatus to communicatively couple on/off valves to controllers in a process control system are disclosed. An example apparatus includes a first interface to receive a command signal from a termination module to be communicatively coupled to a controller in a process control system. The command signal is directed to an on/off valve in the process control system. The first interface transmits a feedback signal to the termination module in response to the command signal. The example apparatus also includes a second interface to receive position information from proximity sensors in a switch box monitoring a state of the on/off valve. The feedback signal is based on the position information. The example apparatus further includes a communication processor to be communicatively coupled to the first and the second interfaces to process the command signal and the feedback signal.

An example method includes receiving, via an interface, a command signal from a termination module communicatively coupled to a controller in a process control system. The command signal is directed to an on/off valve in the process control system. The interface is contained in a housing physically coupled to the on/off valve. The example method further includes transmitting, via the interface, a feedback signal to the termination module in response to the command signal. The feedback signal is generated from a switch box monitoring a state of the on/off valve.

An example tangible machine readable storage medium having instructions stored thereon, which when executed, cause a machine to at least receive, via an interface, a command signal from a termination module communicatively coupled to a controller in a process control system. The command signal is directed to an on/off valve in the process control system. The interface is contained in a housing physically coupled to the on/off valve. The example instructions further cause the machine to transmit, via the interface, a feedback signal to the termination module in response to the command signal. The feedback signal is generated from a switch box monitoring a state of the on/off valve.

DETAILED DESCRIPTION

Although the following describes example apparatus and systems including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the following describes example apparatus and systems, persons of ordinary skill in the art will readily appreciate that the examples provided are not the only way to implement such apparatus and systems.

Figure 1:
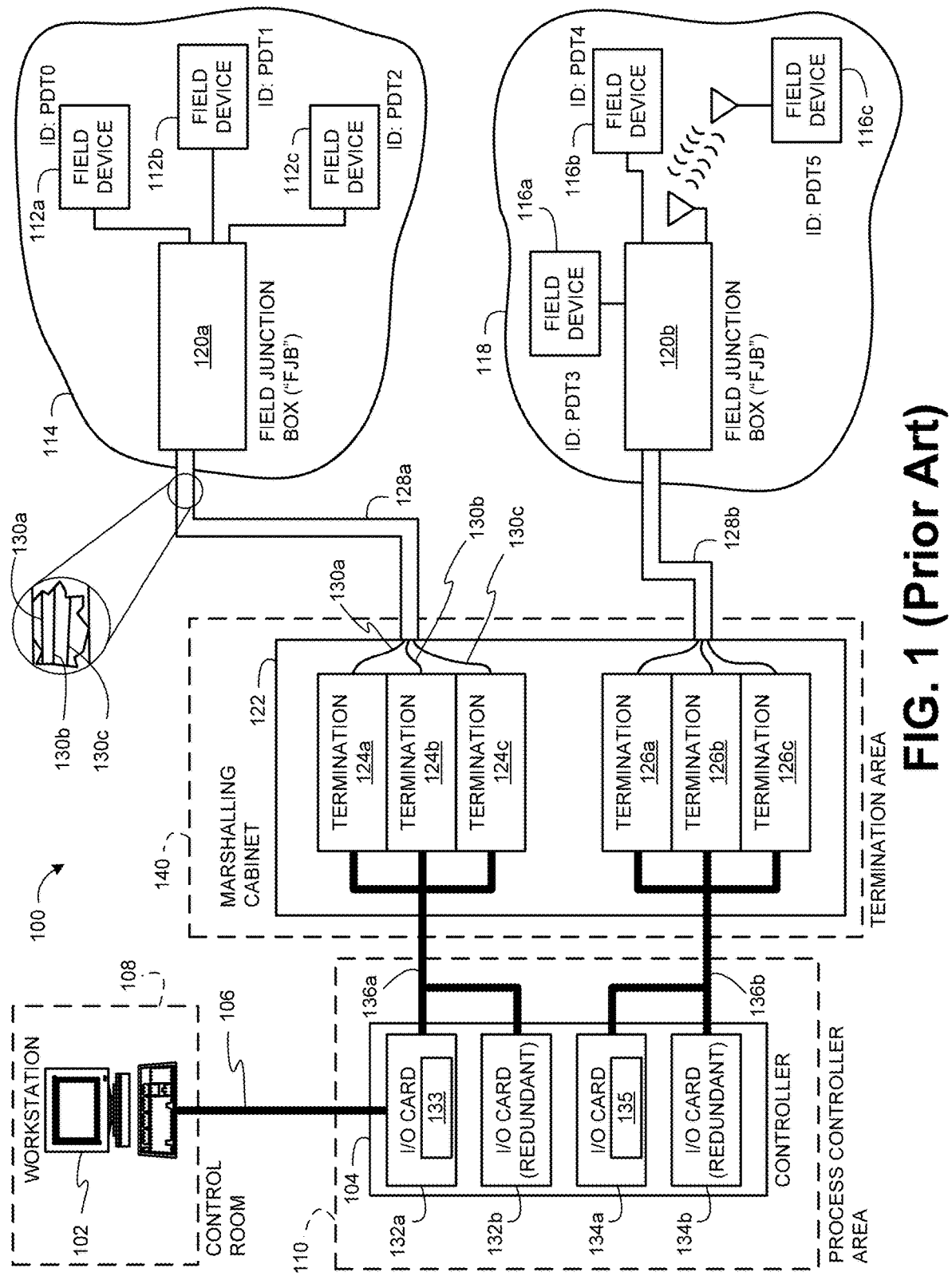
FIG. 1 is a block diagram illustrating an example process control system.

An example process control system includes a control room (e.g., a control room 108 of FIG. 1), a process controller area (e.g. a process controller area 110 of FIG. 1), a termination area (e.g., a termination area 140 of FIG. 1), and one or more process areas (e.g., process areas 114 and 118 of FIG. 1). A process area includes a plurality of field devices that perform operations (e.g., controlling valves, controlling motors, controlling boilers, monitoring, measuring parameters, etc.) associated with performing a particular process (e.g., a chemical process, a petroleum process, a pharmaceutical process, a pulp and paper process, etc.). Some process areas are not accessible by humans due to harsh environment conditions (e.g., relatively high temperatures, airborne toxins, unsafe radiation levels, etc.). The control room typically includes one or more workstations within an environment that is safely accessible by humans. The workstations include user applications that users (e.g., engineers, operators, etc.) can access to control operations of the process control system by, for example, changing variable values, process control functions, etc. The process control area includes one or more controllers communicatively coupled to the workstation(s) in the control room. The controllers automate control of the field devices in the process area by executing process control strategies implemented via the workstation. An example process strategy involves measuring a pressure using a pressure sensor field device and automatically sending a command to a valve positioner to open or close a flow valve based on the pressure measurement. The termination area includes a marshalling cabinet that enables the controllers to communicate with the field devices in the process area. In particular, the marshalling cabinet includes a plurality of termination modules used to marshal, organize, or route signals from the field devices to one or more I/O cards communicatively coupled to the controllers. The I/O cards translate information received from the field devices to a format compatible with the controllers and translate information from the controllers to a format compatible with the field devices.

Known techniques used to communicatively couple field devices within a process control system to controllers involve using a separate bus (e.g., a wire, a cable, or a circuit) between each field device and a respective I/O card communicatively coupled to a controller (e.g., a process controller, a programmable logic controller, etc.). An I/O card enables communicatively coupling a controller to a plurality of field devices associated with different data types or signal types (e.g., analog in (AI) data types, analog out (AO) data types, discrete in (DI) data types, discrete out (DO) data types, digital in data types, and digital out data types)) and different field device communication protocols by translating or converting information communicated between the controller and the field devices. For example, an I/O card may be provided with one or more field device interfaces configured to exchange information with a field device using the field device communication protocol associated with that field device. Different field device interfaces communicate via different channel types (e.g., analog in (AI) channel types, analog out (AO) channel types, discrete in (DI) channel types, discrete out (DO) channel types, digital in channel types, and digital out channel types)). In addition, the I/O card can convert information (e.g., voltage levels) received from the field device into information (e.g., pressure measurement values) that the controller can use to perform operations associated with controlling the field device. The known techniques require a bundle of wires or buses (e.g., a multi-core cable) to communicatively couple a plurality of field devices to I/O cards.

Unlike these known techniques that use a separate bus to communicatively couple each field device to I/O cards, some known apparatus and methods communicatively couple field devices to an I/O card by terminating a plurality of field devices at a termination panel (e.g., a marshalling cabinet) and using one bus (e.g., a conductive communication medium, an optical communication medium, a wireless communication medium) communicatively coupled between the termination panel and the I/O card to communicatively couple the field devices to the I/O card. Such apparatus and methods are disclosed in U.S. Pat. No. 8,332,567, filed on Sep. 19, 2006; U.S. Pat. No. 8,762,618, filed on Dec. 10, 2012; and U.S. patent application Ser. No. 14/170,072, filed on Jan. 31, 2014; all of which are hereby incorporated by reference in their entireties. In brief, such techniques involve using an example universal I/O bus (e.g., a common or shared communication bus) that communicatively couples a plurality of termination modules to one or more I/O cards communicatively coupled to a controller. Each termination module is communicatively coupled to one or more respective field devices using a respective field device bus (e.g., an analog bus or a digital bus). The termination modules are configured to receive field device information from the field devices via the field device buses and communicate the field device information to the I/O cards via the universal I/O bus by, for example, packetizing the field device information and communicating the packetized information to the I/O cards via the universal I/O bus. The I/O card(s) can extract the field device information received via the universal I/O bus and communicate the field device information to the controller, which can then communicate some or all of the information to one or more workstation terminals for subsequent analysis. Likewise, the I/O cards can packetize the field device information from workstation terminals and communicate the packetized field device information to the plurality of termination modules via the universal I/O bus. Each of the termination modules can then extract or depacketize respective field device information from the packetized communications received from a respective I/O card and communicate the field device information to a respective field device.

Some field devices require multiple I/O channels to operate. For example, many on/off valves are implemented with a switch box containing position sensors to detect an ON state (open) and an OFF state (closed) of the valve, which may be transmitted to a controller as feedback signals on two separate discrete input channels. Additionally, to control or drive an on/off valve to switch between its open state and its closed state, a control signal from a controller may be sent to the valve on a separate discrete output channel. Thus, an on/off valve may use three I/O channels (two discrete inputs and one discrete output). Where such an on/off valve is implemented in a control system that uses a separate bus to communicatively couple each field device to I/O cards, the on/off valve would require three separate cables (e.g., containing a pair of wires) running to separate termination points on the I/O cards. Further, in some such situations, the cables may connect to different I/O cards coupled to more than one controller (e.g., first I/O cards in a first controller for the discrete inputs and second I/O cards in a second controller for the discrete output).

While control systems that implement a universal I/O bus remove the need for multiple controllers and multiple independent cables running back to the associated I/O cards, implementing an on/off valve in such systems using known techniques would be accomplished using three separate termination modules each corresponding to one of the discrete I/O signals associated with the on/off valve. As such, the number of on/off valves that can be serviced by a single termination panel (e.g., a single marshalling cabinet) is significantly limited because the amount of space or footprint within the termination panel dedicated to a single device (e.g., a single on/off valve) corresponds to the size of three termination modules rather than merely one. For example, if a marshalling cabinet is limited to 96 termination modules, only 32 on/off valves could be communicatively coupled because each valve uses three termination modules. As a result, to control more than 32 on/off valves involves an additional expense of setting up another marshalling cabinet with additional termination modules. In some examples, the space for an additional marshalling cabinet is not available. For example, many process skids include a number of on/off valves but have a limited, pre-defined space for a field enclosure or marshalling cabinet such that an additional marshalling cabinet is not an option. In some such examples, using three termination modules for each on/off valve may use all available space before every field device on the skid can be communicatively coupled for control purposes.

Examples disclosed herein overcome the above limitations of the apparatus and methods known in the art. In particular, an example multi-channel transceiver is disclosed that communicatively couples each of the two discrete inputs of an on/off valve and the discrete output of the on/off valve with a single termination module configured to drive the valve (via the discrete output) and processing feedback from the valve (via the discrete inputs). In some disclosed examples, the transceiver is mounted and/or retrofitted to the on/off valve and includes wires to connect to the input and output interfaces of the on/off valve. As a result, signals to be transmitted to and/or received by the on/off valve pass through the example transceiver so that only a single cable needs to run between the on/off valve (via the transceiver) and a single termination module.

Now turning to FIG. 1, an example process control system 100 is shown implemented according to the teaching of U.S. Pat. No. 8,332,567. The example process control system of 100 includes a workstation 102 communicatively coupled to a controller 104 via a bus or local area network (LAN) 106, which is commonly referred to as an application control network (ACN). The LAN 106 may be implemented using any desired communication medium and protocol. For example, the LAN 106 may be based on a hardwired or wireless Ethernet communication protocol. However, any other suitable wired or wireless communication medium and protocol could be used. The workstation 102 may be configured to perform operations associated with one or more information technology applications, user-interactive applications, and/or communication applications. For example, the workstation 102 may be configured to perform operations associated with process control-related applications and communication applications that enable the workstation 102 and the controller 104 to communicate with other devices or systems using any desired communication media (e.g., wireless, hardwired, etc.) and protocols (e.g., HTTP, SOAP, etc.). The controller 104 may be configured to perform one or more process control routines or functions that have been generated by a system engineer or other system operator using, for example, the workstation 102 or any other workstation and which have been downloaded to and instantiated in the controller 104. In the illustrated example, the workstation 102 is located in a control room 108 and the controller 104 is located in a process controller area 110 separate from the control room 108.

In the illustrated example, the example process control system 100 includes field devices 112a-c in a first process area 114 and field devices 116a-c in a second process control area 118. To communicate information between the controller 104 and the field devices 112a-c and 116a-c, the example process control system 100 is provided with field junction boxes (FJB's) 120a-b and a marshalling cabinet 122. Each of the field junction boxes 120a-b routes signals from respective ones of the field devices 112a-c and 116a-c to the marshalling cabinet 122. The marshalling cabinet 122, in turn, marshals (e.g., organizes, groups, etc.) information received from field devices 112a-c and 116a-c and routes the field device information to respective I/O cards (e.g., I/O cards 132a-b and 134a-b) of the controller 104. In the illustrated example, the communications between the controller 104 and the field devices 112a-c and 116a-c are bidirectional so that the marshalling cabinet 122 is also used to route information received from I/O cards of the controller 104 to respective ones of the field devices 112a-c and 116a-c via the field junction boxes 120a-b.

Figure 2:
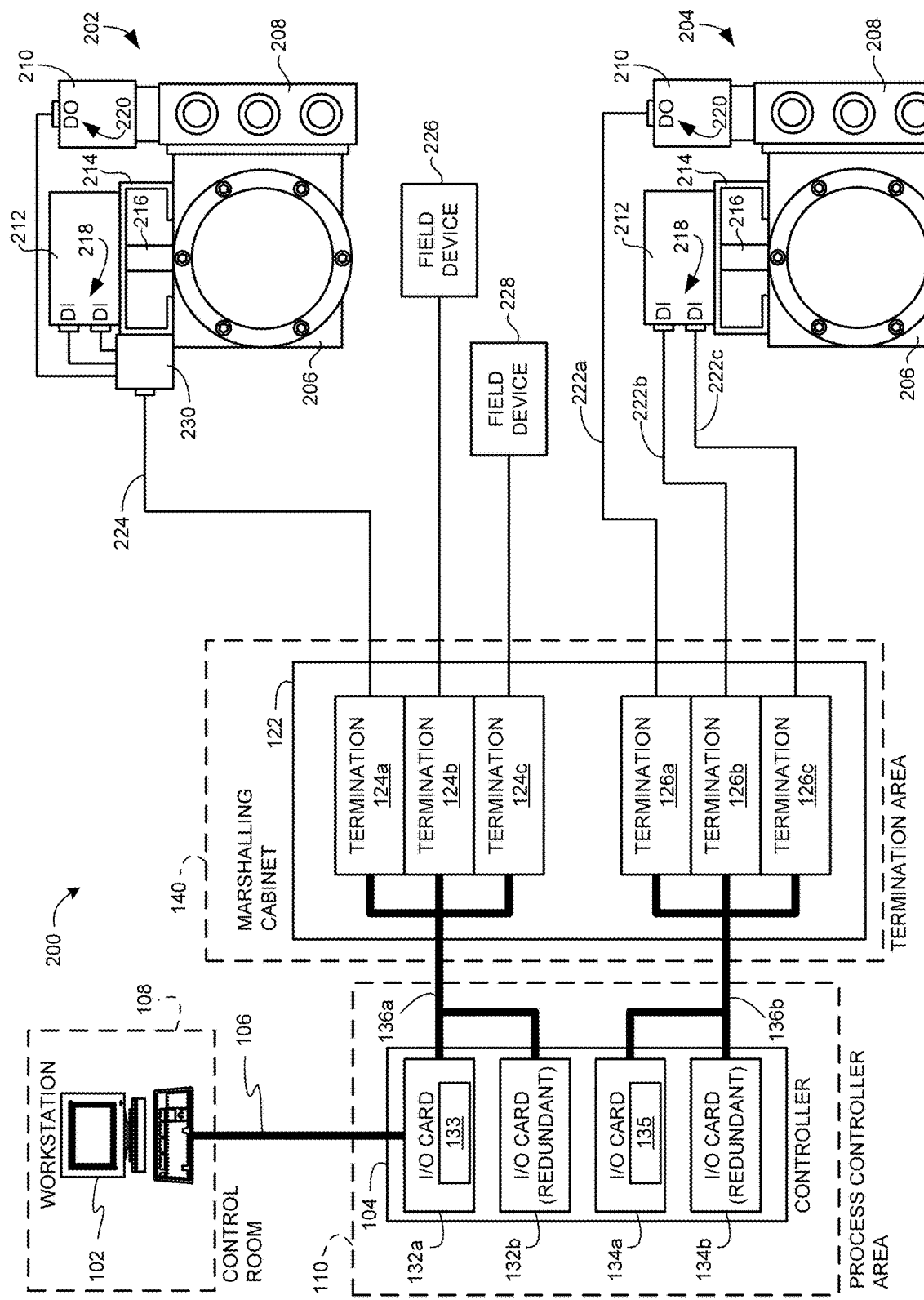
FIG. 2 is a block diagram of another example process control system that includes an example on/off valve implemented in accordance with the teachings disclosed herein.

In the illustrated example, the field devices 112a-c are communicatively coupled to the field junction box 120a and the field devices 116a-c are communicatively coupled to the field junction box 120b via electrically conductive, wireless, and/or optical communication media. For example, the field junction boxes 120a-b may be provided with one or more electrical, wireless, and/or optical data transceivers to communicate with electrical, wireless, and/or optical transceivers of the field devices 112a-c and 116a-c. In the illustrated example, the field junction box 120b is communicatively coupled wirelessly to the field device 116c. In an alternative example implementation, the marshalling cabinet 122 may be omitted and signals from the field devices 112a-c and 116a-c can be routed from the field junction boxes 120a-b directly to the I/O cards of the controller 104. In yet another example implementation, the field junction boxes 120a-b may be omitted and the field devices 112a-c and 116a-c can be directly connected to the marshalling cabinet 122 (e.g., as shown in FIG. 2 below).

The field devices 112a-c and 116a-c may be Fieldbus compliant valves, actuators, sensors, etc., in which case the field devices 112a-c and 116a-c communicate via a digital data bus using the well-known FOUNDATION Fieldbus communication protocol (e.g., FF-H1). Of course, other types of field devices and communication protocols could be used instead. For example, the field devices 112a-c and 116a-c could instead be Profibus (e.g., Profibus PA), HART, or AS-i compliant devices that communicate via the data bus using the well-known Profibus and HART communication protocols. In some example implementations, the field devices 112a-c and 116a-c can communicate information using analog communications or discrete communications instead of digital communications. In addition, the communication protocols can be used to communicate information associated with different data types.

Each of the field devices 112a-c and 116a-c is configured to store field device identification information. The field device identification information may be a physical device tag (PDT) value, a device tag name, an electronic serial number, etc. that uniquely identifies each of the field devices 112a-c and 116a-c. In the illustrated example of FIG. 1, the field devices 112a-c store field device identification information in the form of physical device tag values PDT0-PDT2 and the field devices 116a-c store field device identification information in the form of physical device tag values PDT3-PDT5. The field device identification information may be stored or programmed in the field devices 112a-c and 116a-c by a field device manufacturer and/or by an operator or engineer involved in installation of the field devices 112a-c and 116a-c.

To route information associated with the field devices 112a-c and 116a-c in the marshalling cabinet 122, the marshalling cabinet 122 is provided with a plurality of termination modules 124a-c and 126a-c. The termination modules 124a-c are configured to marshal information associated with the field devices 112a-c in the first process area 114 and the termination modules 126a-c are configured to marshal information associated with the field devices 116a-c in the second process area 118. As shown, the termination modules 124a-c and 126a-c are communicatively coupled to the field junction boxes 120a-b via respective multi-conductor cables 128a and 128b (e.g., a multi-bus cable). In an alternative example implementation in which the marshalling cabinet 122 is omitted, the termination modules 124a-c and 126a-c can be installed in respective ones of the field junction boxes 120a-b.

The illustrated example of FIG. 1 depicts a point-to-point configuration in which each conductor or conductor pair (e.g., bus, twisted pair communication medium, two-wire communication medium, etc.) in the multi-conductor cables 128a-b communicates information uniquely associated with a respective one of the field devices 112a-c and 116a-c. For example, the multi-conductor cable 128a includes a first conductor 130a, a second conductor 130b, and a third conductor 130c. Specifically, the first conductor 130a is used to form a first data bus configured to communicate information between the termination module 124a and the field device 112a, the second conductor 130b is used to form a second data bus configured to communicate information between the termination module 124b and the field device 112b, and the third conductor 130c is used to form a third data bus configured to communicate information between the termination module 124c and the field device 112c. In an alternative example implementation using a multi-drop wiring configuration, each of the termination modules 124a-c and 126a-c can be communicatively coupled with one or more field devices. For example, in a multi-drop configuration, the termination module 124a can be communicatively coupled to the field device 112a and to another field device (not shown) via the first conductor 130a. In some example implementations, a termination module can be configured to communicate wirelessly with a plurality of field devices using a wireless mesh network.

Each of the termination modules 124a-c and 126a-c may be configured to communicate with a respective one of the field devices 112a-c and 116a-c using a different data type.

For example, the termination module 124a may include a digital field device interface to communicate with the field device 112a using digital data while the termination module 124b may include an analog field device interface to communicate with the field device 112b using analog data.

To control I/O communications between the controller 104 (and/or the workstation 102) and the field devices 112a-c and 116a-c, the controller 104 is provided with the plurality of I/O cards 132a-b and 134a-b. In the illustrated example, the I/O cards 132a-b are configured to control I/O communications between the controller 104 (and/or the workstation 102) and the field devices 112a-c in the first process area 114, and the I/O cards 134a-b are configured to control I/O communications between the controller 104 (and/or the workstation 102) and the field devices 116a-c in the second process area 118.

In the illustrated example of FIG. 1, the I/O cards 132a-b and 134a-b reside in the controller 104. To communicate information from the field devices 112a-c and 116a-c to the workstation 102, the I/O cards 132a-b and 134a-b communicate the information to the controller 104 and the controller 104 communicates the information to the workstation 102. Similarly, to communicate information from the workstation 102 to the field devices 112a-c and 116a-c, the workstation 102 communicates the information to the controller 104, the controller 104 then communicates the information to the I/O cards 132a-b and 134a-b, and the I/O cards 132a-b and 134a-b communicate the information to the field devices 112a-c and 116a-c via the termination modules 124a-c and 126a-c. In an alternative example implementation, the I/O cards 132a-b and 134a-b can be communicatively coupled to the LAN 106 internal to the controller 104 so that the I/O cards 132a-b and 134a-b can communicate directly with the workstation 102 and/or the controller 104.

To provide fault tolerant operations in the event that either of the I/O cards 132a and 134a fails, the I/O cards 132b and 134b are configured as redundant I/O cards. That is, if the I/O card 132a fails, the redundant I/O card 132b assumes control and performs the same operations as the I/O card 132a would otherwise perform. Similarly, the redundant I/O card 134b assumes control when the I/O card 134a fails.

To enable communications between the termination modules 124a-c and the I/O cards 132a-b and between the termination modules 126a-c and the I/O cards 134a-b, the termination modules 124a-c are communicatively coupled to the I/O cards 132a-b via a first universal I/O bus 136a and the termination modules 126a-c are communicatively coupled to the I/O cards 134a-b via a second universal I/O bus 136b. Unlike the multi-conductor cables 128a and 128b, which use separate conductors or communication mediums for each one of the field devices 112a-c and 116a-c, each of the universal I/O buses 136a-b is configured to communicate information corresponding to a plurality of field devices (e.g., the field devices 112a-c and 116a-c) using the same communication medium. For example, the communication medium may be a serial bus, a two-wire communication medium (e.g., twisted-pair), an optical fiber, a parallel bus, etc. via which information associated with two or more field devices can be communicated using, for example, packet-based communication techniques, multiplexed communication techniques, etc.

In an example implementation, the universal I/O buses 136a-b are implemented using the RS-485 serial communication standard. The RS-485 serial communication standard can be configured to use less communication control overhead (e.g., less header information) than other known communication standards (e.g., Ethernet). However, in other example implementations, the universal I/O buses 136a-b can be implemented using any other suitable communication standard including Ethernet, universal serial bus (USB), IEEE 1394, etc. In addition, although the universal I/O buses 136a-b are described above as wired communication mediums, in another example implementation, one or both of the universal I/O buses 136a-b can be implemented using a wireless communication medium (e.g., wireless Ethernet, IEEE-802.11, Wi-Fi®, Bluetooth®, etc.).

The universal I/O buses 136a and 136b are used to communicate information in substantially the same manner. In the illustrated example, the I/O bus 136a is configured to communicate information between the I/O cards 132a-b and the termination modules 124a-c. The I/O cards 132a-b and the termination modules 124a-c use an addressing scheme to enable the I/O cards 132a-b to identify which information corresponds to which one of the termination modules 124a-c and to enable each of the termination modules 124a-c to determine which information corresponds to which of the field devices 112a-c. When a termination module (e.g., one of the termination modules 124a-c and 126a-c) is connected to one of the I/O cards 132a-b and 134a-b, that I/O card automatically obtains an address of the termination module (from, for example, the termination module) to exchange information with the termination module. In this manner, the termination modules 124a-c and 126a-c can be communicatively coupled anywhere on the respective buses 136a-b without having to manually supply termination module addresses to the I/O cards 132a-b and 134a-b and without having to individually wire each of the termination modules 124a-c and 126a-c to the I/O cards 132a-b and 134a-b.

By using the universal I/O buses 136a-b, the number of communication media (e.g., wires) required to communicate information between the marshalling cabinet 122 and the controller 104 is substantially reduced relative to known configurations that require a separate communication medium for each termination module to communicate with a controller. Reducing the number of communication media (e.g., reducing the number of communication buses or communication wires) required to communicatively couple the marshalling cabinet 122 to the controller 104 reduces engineering costs required to design and generate drawings for installation of the connections between the controller 104 and the field devices 112a-c and 116a-c. In addition, reducing the number of communication media, in turn, reduces installation costs and maintenance costs. For example, one of the I/O buses 136a-b replaces a plurality of communication media used in known systems to communicatively couple field devices to a controller. Therefore, instead of maintaining a plurality of communication media for communicatively coupling the field devices 112a-c and 116a-c to the I/O cards 132a-b and 134a-b, the illustrated example of FIG. 1 requires substantially less maintenance by using the I/O buses 136a-b.

In addition, reducing the number of communication media required to communicatively couple the marshalling cabinet 122 to the I/O cards 132a-b and 134a-b results in more available space for more termination modules (e.g., the termination modules 124a-c and 126a-c), thereby increasing the I/O density of the marshalling cabinet 122 relative to known systems. In the illustrated example of FIG. 1, the marshalling cabinet 122 can hold a number of termination modules that would otherwise require more marshalling cabinets (e.g., three marshalling cabinets) in a known system implementation.

By providing the termination modules 124a-c and the termination modules 126a-c that can be configured to use different data type interfaces (e.g., different channel types) to communicate with the field devices 112a-c and 116a-c and that are configured to use respective common I/O buses 136a and 136b to communicate with the I/O cards 132a-b and 134a-b, the illustrated example of FIG. 1 enables routing data associated with different field device data types (e.g., the data types or channel types used by the field devices 112a-c and 116a-c) to the I/O cards 132a-b and 134a-b without having to implement a plurality of different field device interface types on the I/O cards 132a-b and 134a-b. Therefore, an I/O card having one interface type (e.g., an I/O bus interface type for communicating via the I/O bus 136a and/or the I/O bus 136b) can communicate with a plurality of field devices having different field device interface types.

Using the I/O bus 136a and/or the I/O bus 136b to exchange information between the controller 104 and the termination modules 124a-c and 126a-c enables defining field device-to-I/O card connection routing late in a design or installation process. For example, the termination modules 124a-c and 126a-c can be placed in various locations within the marshalling cabinet 122 while maintaining access to a respective one of the I/O buses 136a and 136b.

In the illustrated example, the marshalling cabinet 122, the termination modules 124a-c and 126a-c, the I/O cards 132a-b and 134a-b, and the controller 104 facilitate migrating existing process control system installations to a configuration substantially similar to the configuration of the example process control system 100 of FIG. 1. For example, because the termination modules 124a-c and 126a-c can be configured to include any suitable field device interface type, the termination modules 124a-c and 126a-c can be configured to be communicatively coupled to existing field devices already installed in a process control system. Similarly, the controller 104 can be configured to include a known LAN interface to communicate via a LAN to an already installed workstation. In some example implementations, the I/O cards 132a-b and 134a-b can be installed in or communicatively coupled to known controllers so that controllers already installed in a process control system need not be replaced.

In the illustrated example, the I/O card 132a includes a data structure 133 and the I/O card 134a includes a data structure 135. The data structure 133 stores the field device identification numbers (e.g., field device identification information) corresponding to field devices (e.g., the field devices 112a-c) that are assigned to communicate with the I/O card 132a via the universal I/O bus 136a. The termination modules 124a-c can use the field device identification numbers stored in the data structure 133 to determine whether a field device is incorrectly connected to one of the termination modules 124a-c. The data structure 135 stores the field device identification numbers (e.g., field device identification information) corresponding to field devices (e.g., the field devices 116a-c) that are assigned to communicate with the I/O card 134a via the universal I/O bus 136b. The data structures 133 and 135 can be populated by engineers, operators, and/or users via the workstation 102 during a configuration time or during operation of the example process control system 100. Although not shown, the redundant I/O card 132b stores a data structure identical to the data structure 133 and the redundant I/O card 134b stores a data structure identical to the data structure 135. Additionally or alternatively, the data structures 133 and 135 can be stored in the workstation 102.

In the illustrated example, the marshalling cabinet 122 is shown located in a termination area 140 separate from the process control area 110. By using the I/O buses 136a-b instead of substantially more communication media (e.g., a plurality of communication buses, each uniquely associated with one of the field devices 112a-c and 116a-c or a limited group of them along a multi-drop segment) to communicatively couple the termination modules 124a-c and 126a-c to the controller 104 facilitates locating the controller 104 relatively farther from the marshalling cabinet 122 than in known configurations without substantially decreasing the reliability of communications. In some example implementations, the process control area 110 and the termination area 140 can be combined so that the marshalling cabinet 122 and the controller 104 are located in the same area. In any case, placing the marshalling cabinet 122 and the controller 104 in areas separate from the process areas 114 and 118 enables isolating the I/O cards 132a-b and 134a-b, the termination modules 124a-c and 126a-c and the universal I/O buses 136a-b from harsh environmental conditions (e.g., heat, humidity, electromagnetic noise, etc.) that may be associated with the process areas 114 and 118. In this manner, the cost and complexity of designing and manufacturing the termination modules 124a-c and 126a-c and the I/O cards 132a-b and 134a-b can be substantially reduced relative to the cost of manufacturing communications and control circuitry for the field devices 112a-c and 116a-c because the termination modules 124a-c and 126a-c and the I/O cards 132a-b and 134a-b do not require operating specification features (e.g., shielding, more robust circuitry, more complex error checking, etc.) required to guarantee reliable operation (e.g., reliable data communications) as would otherwise be necessary to operate in the environmental conditions of the process areas 114 and 118.

Additional details and alternative example implementations that may be used to communicatively couple workstations, controllers, and I/O cards, as well as additional details and alternative example implementations of the example marshalling cabinet 122 and termination modules 124a-c and 126a-c are disclosed in U.S. Pat. No. 8,332,567, incorporated above.

FIG. 2 is a block diagram illustrating an example process control system 200 including an example on/off valve 202 implemented in accordance with the teachings disclosed herein. For purposes of explanation, the example process control system 200 of FIG. 2 is described using the same reference numerals for common parts described in connection with the example process control system 100 of FIG. 1. Thus, in the illustrated example of FIG. 2, the process control system 200 includes the workstation 102 communicatively coupled to the controller 104 via the LAN 106. Further, the example controller 104 includes the I/O cards 132a-b and 134a-b that are communicatively coupled to the termination modules 124a-c and 126a-c within the example marshalling cabinet 122 via the corresponding universal I/O buses 136a-b.

As shown in the illustrated example of FIG. 2, the example process control system 200 includes the example on/off valve 202 implemented in accordance with the teachings disclosed herein and a second on/off valve 204 implemented according to known techniques. In the illustrated example, the second on/off valve 204 is similar to the first example on/off valve 202 except that the first example on/off valve 202 includes a multi-channel transceiver 230 described more fully below. In the illustrated example, the first and second on/off valves 202, 204 include a main valve 206, a pilot valve 208 through which a pneumatic pressure supply is connected to the main valve 206, and a solenoid valve 210 to actuate the pilot valve 208. Additionally, the example on/off valves 202, 204 include a feedback signal box or switch box 212 mounted to the main valve 206 via a bracket or frame 214. In some examples, the switch box 212 includes proximity sensors that monitor the rotation of a shaft 216 associated with the main valve 206 to detect an operational state (e.g., open or closed) of the main valve 206. For example, a first proximity sensor may generate an ON signal when the first sensor detects that the valve 206 is open and a second proximity sensor may generate an OFF signal when the second sensor detects that the valve 206 is closed. Thus, as shown in the illustrated example of FIG. 2, the example arrangement of the first and second on/off valves 202, 204 involves three I/O channels including two discrete inputs (DIs) 218 corresponding to the ON signal (indicative of an open valve state) and the OFF signal (indicative of a closed valve state) and one discrete output (DO) 220 to provide a control signal to the solenoid 210 to drive the main valve 206 to either the open or closed state.

In known techniques, as illustrated by the second on/off valve 204, each of the two DIs 218 and the one DO 220 are communicated back to separate termination modules 126a-c over separate conductors 222a-c (e.g., separate pairs of twisted wire). In such implementations, the on/off valve 204 requires three termination modules 126a-c, thereby significantly increasing the footprint or space needed in the marshalling cabinet 122 to communicate with such on/off valves and/or significantly limiting the number of such on/off valves that can be controlled via a single marshalling cabinet 122 of a given size.

In contrast to the known implementation of the on/off valve 204, the example on/off valve 202 is implemented in accordance with the teachings disclosed herein to enable the operation of the on/off valve 202 through a single conductor 224 (e.g., a single pair of twisted wires). In this manner, as shown in the illustrated example, the on/off valve 202 is communicatively coupled with only one termination module 124a such that other field devices 226, 228 may be coupled to the other termination modules 124b-c. Accordingly, the teachings disclosed herein reduce the footprint needed in the marshalling cabinet 122 to operate the first on/off valve 202 to one third the space used to operate the second on/off valve 204 implemented using known techniques. In other words, the same marshalling cabinet (e.g., same size) can accommodate three times as many on/off valves when implemented in accordance with the teachings disclosed herein as compared with known methods.

As noted above, the example on/off valve 202 includes the example multi-channel transceiver 230 that is communicatively coupled with each of the three I/Os (e.g., the two DIs 218 and the one DO 220) associated with the on/off valve 202 and also coupled to the termination module 124a via the conductor 224. Thus, in the illustrated example, the transceiver 230 is configured to receive commands or signals from the controller 104 via the termination module 124a and to transmit such signals to the DO 220 associated with the solenoid 210 to drive the main valve 206. Further, the transceiver 230 of the illustrated example is configured to receive feedback signals corresponding to the two DIs 218 based on position information detected by the proximity sensors in the switch box 212 indicative of the state of the valve (e.g., open or closed). In the illustrated example, the transceiver 230 transmits the feedback signals (e.g., the DI signals) back to the controller 104 via the termination module 124a in response to a request from the controller 104 over the same conductor 224.

In the illustrated example, the transceiver 230 is mounted to the on/off valve 202 via the bracket 214. In some examples, the transceiver 230 is physically coupled to the on/off valve 202 in other manners (e.g., mounted to another component of the on/off valve 202). For example, the transceiver 230 may be structured (e.g., with a threaded interface) to attach to the switch box 212 at a cable gland entry. In other examples, the transceiver 230 may be mounted to a solenoid valve adapter plate positioned next to the solenoid valve 210. In this manner, the transceiver 230 is easily retrofitted to existing on/off valves. In some examples, the transceiver 230 may be integrated into the switch box 212. In other examples, the transceiver 230 is contained within its own housing. In some examples, rather than directly mounting or physically coupling the transceiver 230 to the on/off valve 202, the transceiver 230 is maintained separate from the on/off valve 202 but in sufficient proximity to be communicatively coupled to each of the I/Os 218, 220 associated with the on/off valve 202. While a pneumatic on/off valve actuated via the solenoid 210 is shown in the illustrated example of FIG. 1, the example transceiver 230 may be configured and correspondingly coupled to different types of on/off valves with different types of actuators. For example, the on/off valve may alternatively be a motor operated valve running on 120 volt AC power. Additionally or alternatively, in some examples, the termination module 124a and/or the transceiver 230 may be configured to handle on/off valves associated with more complex control capabilities such as, for example, forward/off/reverse applications or left/hold/right applications.

Figure 3:
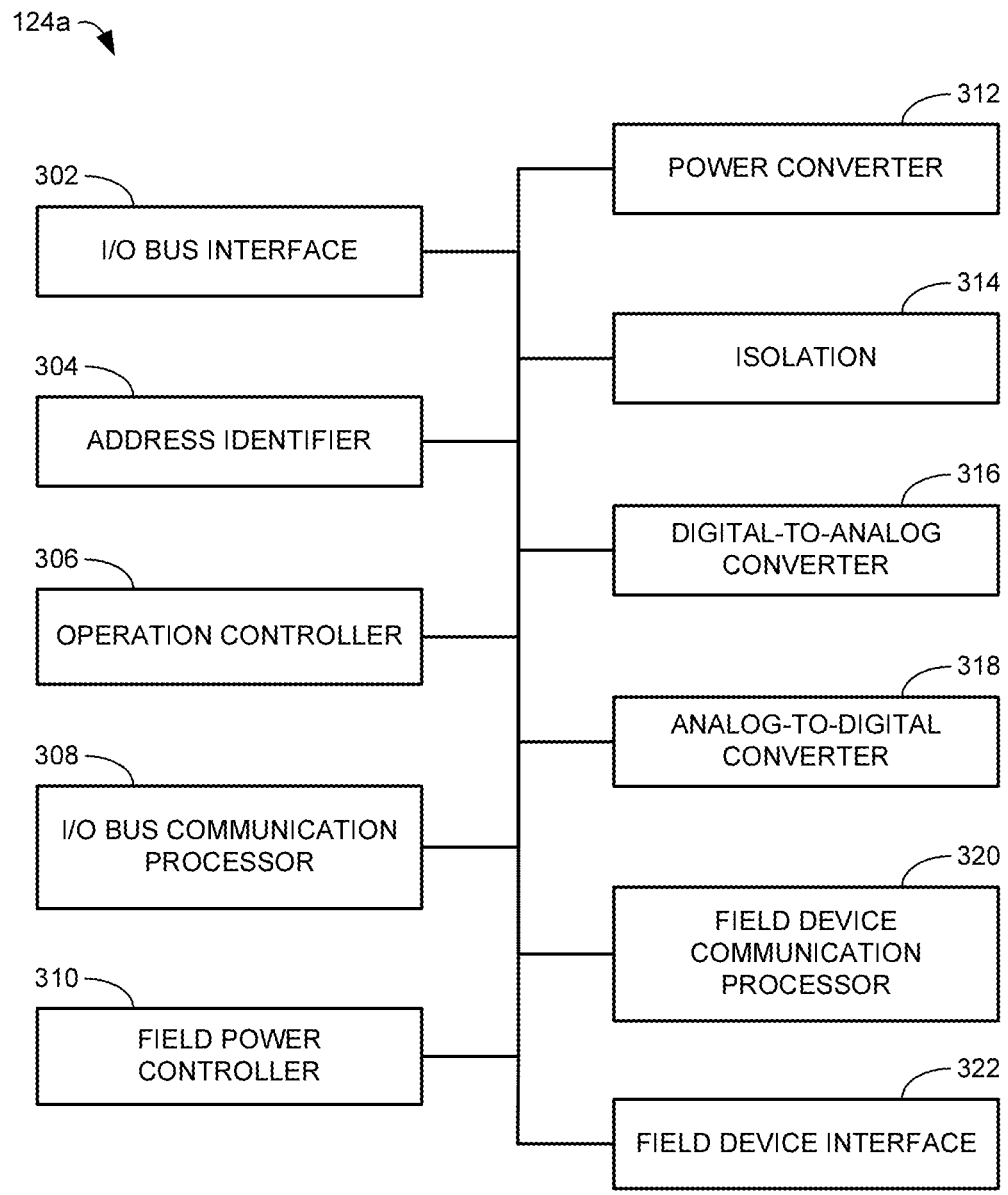
FIG. 3 is a detailed block diagram of the example termination module of FIGS. 1 and 2.

FIG. 3 is a detailed block diagram of the example termination module 124a of FIGS. 1 and 2. The example termination module 124a includes a universal I/O bus interface 302 to enable the example termination module 124a to communicate with the I/O cards 132a-b of FIG. 1 (or with any other I/O cards). The I/O bus interface 302 may be implemented using, for example, the RS-485 serial communication standard, Manchester Bus Powered (MBP) transmission technology, Ethernet, etc. To identify an address of the termination module 124a and/or an address of the I/O card 132a, the termination module 124a is provided with an address identifier 304. The address identifier 304 may be configured to query the I/O card 132a (FIG. 1) for a termination module address (e.g., a network address) when the termination module 124a is plugged into the marshalling cabinet 122. In this manner, the termination module 124a can use the termination module address as a source address when communicating information to the I/O card 132a and the I/O card 132a uses the termination module address as a destination address when communicating information to the termination module 124a.

To control the various operations of the termination module 124a, the termination module 124a is provided with an operation controller 306. In an example implementation, the operation controller can be implemented using a microprocessor or a microcontroller. The operation controller 306 communicates instructions or commands to other portions of the example termination module 124a to control the operations of those portions.

The example termination module 124a is provided with an I/O bus communication processor 308 to exchange information with the I/O card 132a via the universal I/O bus 136a. In the illustrated example, the I/O bus communication processor 308 packetizes information for transmission to the I/O card 132a and depacketizes information received from the I/O card 132a. In the illustrated example, the I/O bus communication processor 308 generates header information for each packet to be transmitted and reads header information from received packets. Example header information includes a destination address (e.g., the network address of the I/O card 132a), a source address (e.g., the network address of the termination module 124a), a packet type or data type (e.g., analog field device information, field device information, command information, temperature information, real-time data values, etc.), and error checking information (e.g., cyclical-redundancy-check (CRC)). In some example implementations, the I/O bus communication processor 308 and the operation controller 306 may be implemented using the same microprocessor or microcontroller.

To control the amount of power provided to the field device 112a of FIG. 1 or the on/off valve 202 of FIG. 2 (or any other field device), the termination module 124a is provided with a field power controller 310. In some examples, a power supply in the marshalling cabinet 122 provides electrical power to the termination module 124a to power a communication channel interface to communicate with the field device 112a. For example, some field devices communicate using 12 volts and others communicate using 24 volts. In the illustrated example, the field power controller 310 is configured to condition, regulate, and step up and/or step down the electrical power provided to the termination module 124a by the power supply. In some example implementations, the field power controller 310 is configured to limit the amount of electrical power used to communicate with the field devices and/or delivered to the field devices to substantially reduce or eliminate the risk of sparking in flammable or combustible environments.

To convert electrical power received from the power supply to electrical power for the termination module 124a and/or the field device 112a, the termination module 124a is provided with a power converter 312. In the illustrated example, the circuitry used to implement the termination module 124a uses one or more voltage levels (e.g., 3.3 V) that are different from the voltage levels required by the field device 112a. The power converter 312 is configured to provide the different voltage levels for the termination module 124a and the field device 112a using the power received from the power supply. In the illustrated example, the electrical power outputs generated by the power converter 312 are used to power up the termination module 124a and the field device 112a and to communicate information between the termination module 124a and the field device 112a. Some field device communication protocols require relatively higher or lower voltage levels and/or electrical current levels than other communication protocols. In the illustrated example, the field power controller 310 controls the power converter 312 to provide the voltage level(s) to power up the field device 112a and to communicate with the field device 112a. However, in other example implementations, the electrical power outputs generated by the power converter 312 may be used to power up the termination module 124a while a separate power supply external to the marshalling cabinet 122 is used to power up the field device 112a.

To electrically isolate the circuitry of the termination module 124a from the I/O card 132a, the termination module 124a is provided with one or more isolation devices 314. The isolation devices 314 may be implemented using galvanic isolators and/or optical isolators.

To convert between analog and digital signals, the termination module 124a is provided with a digital-to-analog converter 316 and an analog-to-digital converter 318. The digital-to-analog converter 316 is configured to convert digitally represented analog values received from the I/O card 132a to analog values that can be communicated to the field device 112a of FIG. 1. The analog-to-digital converter 318 is configured to convert analog values (e.g., measurement values) received from the field device 112a to digitally represented values that can be communicated to the I/O card 132a. In an alternative example implementation in which the termination module 124a is configured to communicate digitally with the field device 112a, the digital-to-analog converter 316 and the analog-to-digital converter 318 can be omitted from the termination module 124a.

To control communications with the field device 112a, the termination module 124a is provided with a field device communication processor 320. The field device communication processor 320 ensures that information received from the I/O card 132a is in the correct format and voltage type (e.g., analog or digital) to be communicated to the field device 112a. The field device communication processor 320 is also configured to packetize or depacketize information if the field device 112a is configured to communicate using digital information. In addition, the field device communication processor 320 is configured to extract information received from the field device 112a and communicate the information to the analog-to-digital converter 318 and/or to the I/O bus communication processor 308 for subsequent communication to the I/O card 132a.

In the illustrated example, the field device communication processor 320 is also configured to timestamp information received from the field device 112a. Generating timestamps at the termination module 124a facilitates implementing sequence of events (SOE) operations using timestamp accuracies in the sub-millisecond range. For example, the timestamps and respective information can be communicated to the controller 104 and/or the workstation 102. Sequence of events operations performed by, for example, the workstation 102 (FIG. 1) (or any other processor system) can then be used to analyze what happened before, during, and/or after a particular state of operation (e.g., a failure mode) to determine what caused the particular state of operation to occur. Timestamping in the sub-millisecond range enables capturing events using relatively higher granularity. In some example implementations, the field device communication processor 320 and the operation controller 306 can be implemented using the same microprocessor or microcontroller.

In general, field device communication controllers similar to the field device communication processor 320 are provided with communication protocol functions or other communication functions (e.g., Fieldbus communication protocol functions, HART communication protocol functions, etc.) corresponding to the type of field device with which they are configured to communicate. For example, if the field device 112a is implemented using a HART device, the field device communication processor 320 of the termination module 124a is provided with HART communication protocol functions. When the termination module 124a receives information from the I/O card 132a intended for the field device 112a, the field device communication processor 320 formats the information in accordance with the HART communication protocol and delivers the information to the field device 112a. In the context of the on/off valve 202 shown in FIG. 2, the field device communication processor 320 is configured to communicate the appropriate discrete output to drive the solenoid 210 and configured to receive the discrete inputs from the switch box 212 over a single pair of wires (e.g., the conductor 224).

In the illustrated example, the field device communication processor 320 is configured to process pass-through messages. Pass-through messages originate at a workstation (e.g., the workstation 102 of FIG. 1) and are communicated as payload (e.g., the data portion of a communication packet) through a controller (e.g., the controller 104 of FIG. 1) and to a termination module (e.g., the termination module 124a of FIG. 1) for delivery to a field device (e.g., the field device 112a). For example, a message originating at the workstation 102 and intended to be delivered to the field device 112a is tagged at the workstation 102 with a communication protocol descriptor (e.g., a HART protocol descriptor) and/or is formatted in accordance with a communication protocol of the field device 112a. The workstation 102 then wraps the message into a payload(s) of one or more communication packets to deliver the message from the workstation 102, through the I/O controller 104, and to the termination module 124a as a pass-through message. Wrapping the message involves, for example, packetizing the message within header information in accordance with a communication protocol (e.g., a Fieldbus protocol, a HART protocol, etc.) used to communicate with the field devices. When the termination module 124a receives the communication packet(s) containing the pass-through message from the I/O card 132, the I/O bus communication processor 308 (FIG. 3) extracts the payload(s) from the received communication packet(s). The field device communication processor 320 (FIG. 3) then unwraps the pass-through message from the payload(s), formats the message in accordance with the communication protocol descriptor generated by the workstation 102 (if not already formatted at the workstation 102), and communicates the message to the field device 112a.

The field device communication processor 320 is also configured to communicate pass-through messages to the workstation 102 in a similar manner. For example, if the field device 112a generates a message (e.g., a response to the workstation message or any other message) intended to be delivered to the workstation 102, the field device communication processor 320 wraps the message from the field device 112a into the payload of one or more communication packets and the I/O bus communication processor 308 communicates the one or more packets containing the wrapped message to the I/O card 132a. When the workstation 102 receives the packets from the controller 104 containing the wrapped message, the workstation 102 can unwrap and process the message.

The termination module 124a is provided with a field device interface 322 configured to communicatively couple the termination module 124a to a field device (e.g., the field device 112a of FIG. 1). For example, the field device interface 322 may be communicatively coupled to termination screws associated with the termination module 124a via one or more of the contacts.

While an example manner of implementing the termination module 124a of FIG. 2 is illustrated in FIG. 3, one or more of the elements, processes and/or devices illustrated in FIG. 3 may be combined, divided, re-arranged, omitted, eliminated and/or implemented in any other way. Further, the example I/O bus interface 302, the example address identifier 304, the example operation controller 306, the example I/O bus communication processor 308, the example field power controller 310, the example power converter 312, the example isolation devices 314, the example digital-to-analog converter 316, the example analog-to-digital converter 318, the example field device communication processor 320, the example field device interface 322, and/or, more generally, the example termination module 124a of FIG. 3 may be implemented by hardware, software, firmware and/or any combination of hardware, software and/or firmware. Thus, for example, any of the example I/O bus interface 302, the example address identifier 304, the example operation controller 306, the example I/O bus communication processor 308, the example field power controller 310, the example power converter 312, the example isolation devices 314, the example digital-to-analog converter 316, the example analog-to-digital converter 318, the example field device communication processor 320, the example field device interface 322, and/or, more generally, the example termination module 124a could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example I/O bus interface 302, the example address identifier 304, the example operation controller 306, the example I/O bus communication processor 308, the example field power controller 310, the example power converter 312, the example isolation devices 314, the example digital-to-analog converter 316, the example analog-to-digital converter 318, the example field device communication processor 320, and/or the example field device interface 322 is/are hereby expressly defined to include a tangible computer readable storage device or storage disk such as a memory, a digital versatile disk (DVD), a compact disk (CD), a Blu-ray disk, etc. storing the software and/or firmware. Further still, the example termination module 124a of FIG. 2 may include one or more elements, processes and/or devices in addition to, or instead of, those illustrated in FIG. 3, and/or may include more than one of any or all of the illustrated elements, processes and devices.

Figure 4:
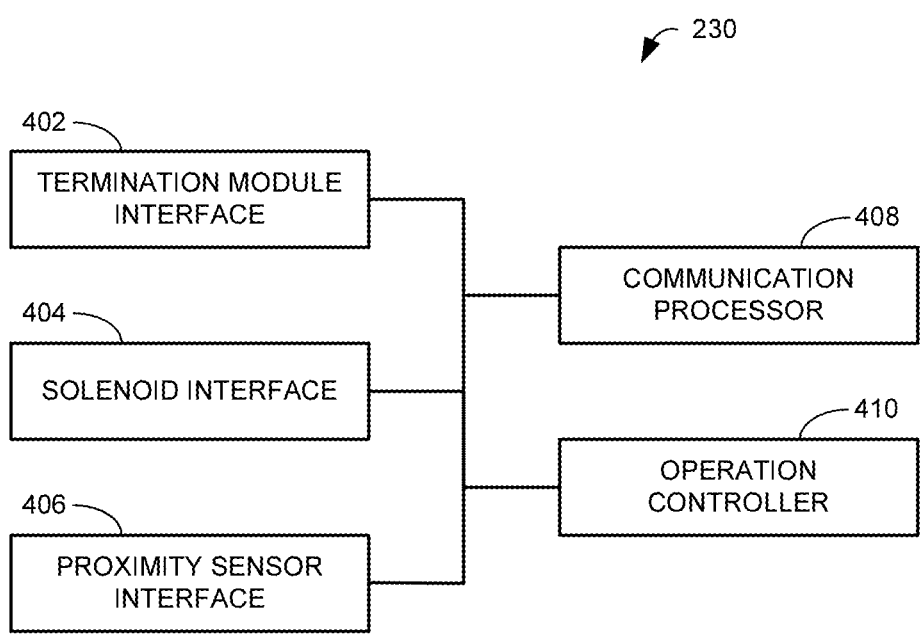
FIG. 4 is a detailed block diagram of the example multi-channel transceiver of FIG. 2.

FIG. 4 is a detailed block diagram of the example transceiver 230 of FIG. 2. The example transceiver 230 includes a termination module interface 402 to enable the example transceiver 230 to communicate with the termination module 124a. The example transceiver 230 includes a solenoid interface 404 to enable the example transceiver 230 to communicate with (e.g., send a discrete output signal to) the solenoid 210. In some examples, the solenoid interface 404 of the example transceiver 230 includes a wire that may be communicatively coupled to the solenoid 210 using any suitable connection. The example transceiver 230 includes a proximity sensor interface 406 to enable the example transceiver 230 to communicate with (e.g., receive discrete input signals from) the positioner sensors in the switch box 212. In some examples, the proximity sensor interface 406 of the example transceiver 230 includes two wires (or two pairs of wires) that may be communicatively coupled to corresponding ON and OFF proximity sensors monitoring the operational state (e.g., opened or closed) of the valve 206.

In the illustrated example, the transceiver 230 is provided with a communication processor 408 to exchange information with the termination module 124a, the solenoid 210, and the proximity sensors in the switch box 212. In the illustrated example, the communication processor 408 controls the receipt and transmission of discrete output signals received from the termination module 124a to drive the solenoid 210. Further, in the illustrated example, the communication processor 408 controls the transmission of the feedback signals received from the discrete inputs associated with the proximity sensors of the switch box 212.

To control the various operations of the transceiver 230, the example transceiver 230 is provided with an operation controller 410. In an example implementation, the operation controller 410 can be implemented using a microprocessor or a microcontroller. The operation controller 410 communicates instructions or commands to other portions of the example transceiver 230 to control the operations of those portions. For example, the operation controller 410 instructs the communication processor 408 to transmit (e.g., via the solenoid interface 404) an output signal to the solenoid 210 that the communication processor 408 previously received (e.g., via the termination module interface 402) from the termination module 124a. Likewise, in some examples, the operation controller 410 instructs the communication processor 408 to transmit (e.g., via the termination module interface 402) input or feedback signals to the termination module 124a that the communication processor 408 previously received (e.g., via the proximity sensor interface 406) from the switch box 212. Further, in some examples, the operation controller 410 manages the appropriate control of the on/off valve 202 if there is some sort of failure in the control system. For example, if the transceiver loses power (provided via the termination module 124a), the output signal will be set to OFF. In such circumstances, when power is restored the operation controller 410 may instruct the communication processor 408 to transmit (e.g., via the solenoid interface 404) a fail action signal to the solenoid to drive the on/off valve 202 to a preconfigured fail state. In some such examples, the operation controller 410 may further instruct the communication processor 408 to transmit (e.g., via the termination module interface 402) an indication to the termination module 124a that the valve 202 is in the fail state. In some example implementations, the communication processor 408 and the operation controller 410 are implemented using the same microprocessor or microcontroller.

While an example manner of implementing the transceiver 230 of FIG. 2 is illustrated in FIG. 4, one or more of the elements, processes and/or devices illustrated in FIG. 4 may be combined, divided, re-arranged, omitted, eliminated and/or implemented in any other way. Further, the example termination module interface 402, the example solenoid interface 404, the example proximity sensor interface 406, the example operation controller 410, the example communication processor 408, and/or, more generally, the example termination module 124a of FIG. 4 may be implemented by hardware, software, firmware and/or any combination of hardware, software and/or firmware. Thus, for example, any of the example termination module interface 402, the example solenoid interface 404, the example proximity sensor interface 406, the example operation controller 410, the example communication processor 408, and/or, more generally, the example termination module 124a could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example termination module interface 402, the example solenoid interface 404, the example proximity sensor interface 406, the example operation controller 410, and/or the example communication processor 408 is/are hereby expressly defined to include a tangible computer readable storage device or storage disk such as a memory, a digital versatile disk (DVD), a compact disk (CD), a Blu-ray disk, etc. storing the software and/or firmware. Further still, the example transceiver 230 of FIG. 2 may include one or more elements, processes and/or devices in addition to, or instead of, those illustrated in FIG. 4, and/or may include more than one of any or all of the illustrated elements, processes and devices.

Figure 5:
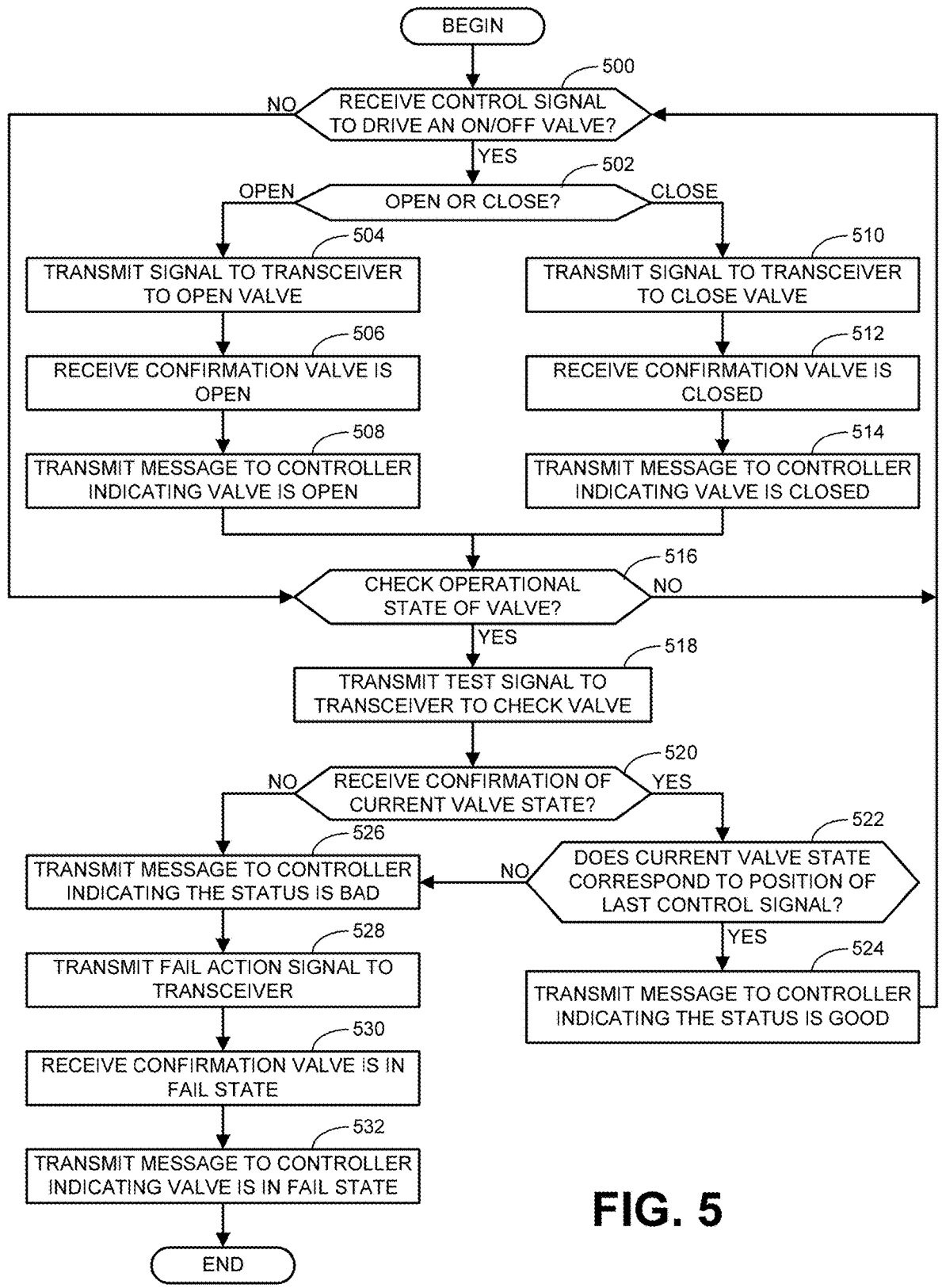
FIG. 5 is a flowchart of an example method that may be used to implement the termination modules of FIGS. 1, 2, and 6 in accordance with the teachings disclosed herein.

A flowchart representative of an example method for implementing the termination module 124a of FIG. 3 is shown in FIG. 5. In this example, the method is implemented as machine readable instructions that comprise a program for execution by a processor such as the processor 712 shown in the example processor platform 700 discussed below in connection with FIG. 7. The program may be embodied in software stored on a tangible computer readable storage medium such as a CD-ROM, a floppy disk, a hard drive, a digital versatile disk (DVD), a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowchart illustrated in FIG. 7, many other methods of implementing the example termination module 124a may alternatively be used. For example, the order of execution of the blocks may be changed, and/or some of the blocks described may be changed, eliminated, or combined.

Turning in detail to FIG. 5, the example process begins at block 500 where the example termination module 124a determines whether it has received a control signal (e.g., from an operator) to drive an on/off valve (e.g., the on/off valve 202 of FIG. 2). For example, the termination module 124a determines that it has received such a control signal if the I/O bus communication processor 308 indicates via, for example, an interrupt or a status register that the control signal has been received. If the example termination module 124a determines that a control signal has been received, control advances to block 502 where the example operation controller 306 determines whether the control signal is to open or close the on/off valve 202. If the example operation controller 306 determines that the control signal is to open the on/off valve 202 (block 502), the example field device communication processor 320 transmits (e.g., via the field device interface 322) a signal to the transceiver 230 to open the on/off valve 202 (block 504). At block 506, the example field device communication processor 320 receives (e.g., from the transceiver 230 via the field device interface 322) confirmation that the on/off valve 202 is open. At block 508, the example I/O bus communication processor 308 transmits (e.g., via the I/O bus interface 302) a message to the controller 104 indicating that the on/off valve 202 is open and then control advances to block 516. If the example operation controller 306 determines that the control signal is to close the on/off valve 202 (block 502), the example field device communication processor 320 transmits (e.g., via the field device interface 322) a signal to the transceiver 230 to close the on/off valve 202 (block 510). At block 512, the example field device communication processor 320 receives (e.g., from the transceiver 230 via the field device interface 322) confirmation that the on/off valve 202 is closed. At block 514, the example I/O bus communication processor 308 transmits (e.g., via the I/O bus interface 302) a message to the controller 104 indicating that the on/off valve 202 is closed and then control advances to block 516. Returning to block 500, if the example termination module 124a determines that a control signal has not been received to open or close the on/off valve 202, control advances directly to block 516.

At block 516, the example operation controller 306 determines whether to check the operational state of the on/off valve 202 (e.g., whether the valve is open or closed relative to the last control signal sent). In some examples, the operation controller 306 determines whether to check the operational state of the on/off valve 202 based on a threshold period of time elapsing since a control signal was last sent and/or since the valve state was last checked. In other examples, the operation controller 306 determines whether to check the operational state of the on/off valve 202 based on receiving a command (e.g., from an operator) to check the on/off valve 202. If the example operation controller 306 determines not to check the operational state of the on/off valve 202 (block 516), control returns to block 500. If the example operation controller 306 determines to check the operational state of the on/off valve 202 (block 516), control advances to block 518 where the example field device communication processor 320 transmits (e.g., via the field device interface 322) a test signal to check the on/off valve 202. At block 520, the example termination module 124a determines whether it has received a confirmation of the current valve state. For example, the termination module 124a determines that it has received a confirmation of the current valve state if the field device communication processor 320 indicates via, for example, an interrupt or a status register that feedback from the transceiver 230 has been received. If the example termination module 124a determines that it has received a confirmation of the current valve state (e.g., the transceiver 230 responds with the requested information), the example operation controller 306 determines whether the current valve state correspond to the state of the last control signal (block 522). That is, the example operation controller 306 determines whether the discrete input signals generated by the proximity sensors of the switch box 212 (indicating whether the valve is open or closed) correspond to the last discrete output signal sent to the solenoid 210 (to open or close the on/off valve 202). If the example operation controller 306 determines that the current valve state does correspond to the state of the last control signal (block 522), control advances to block 524. At block 524, the example I/O bus communication processor 308 transmits (e.g., via the I/O bus interface 302) a message to the controller 104 indicating the status of the on/off valve 202 is good, after which control returns to block 500.

If the example operation controller 306 determines that the current valve state does not correspond to the state of the last control signal (block 522), control advances to block 526. If the example termination module 124a determines that it has not received a confirmation of the current valve state (block 520), control advances directly to block 526. At block 526, the example I/O bus communication processor 308 transmits (e.g., via the I/O bus interface 302) a message to the controller 104 indicating the status of the on/off valve 202 is bad. At block 528, the example field device communication processor 320 transmits (e.g., via the field device interface 322) a fail action signal to the transceiver 230. At block 530, the example field device communication processor 320 receives (e.g., from the transceiver 230 via the field device interface 322) confirmation that the on/off valve 202 is in a fail state. At block 532, the example I/O bus communication processor 308 transmits (e.g., via the I/O bus interface 302) a message to the controller 104 indicating that the on/off valve 202 is in the fail state, at which point the example process of FIG. 5 ends.

Figure 6:
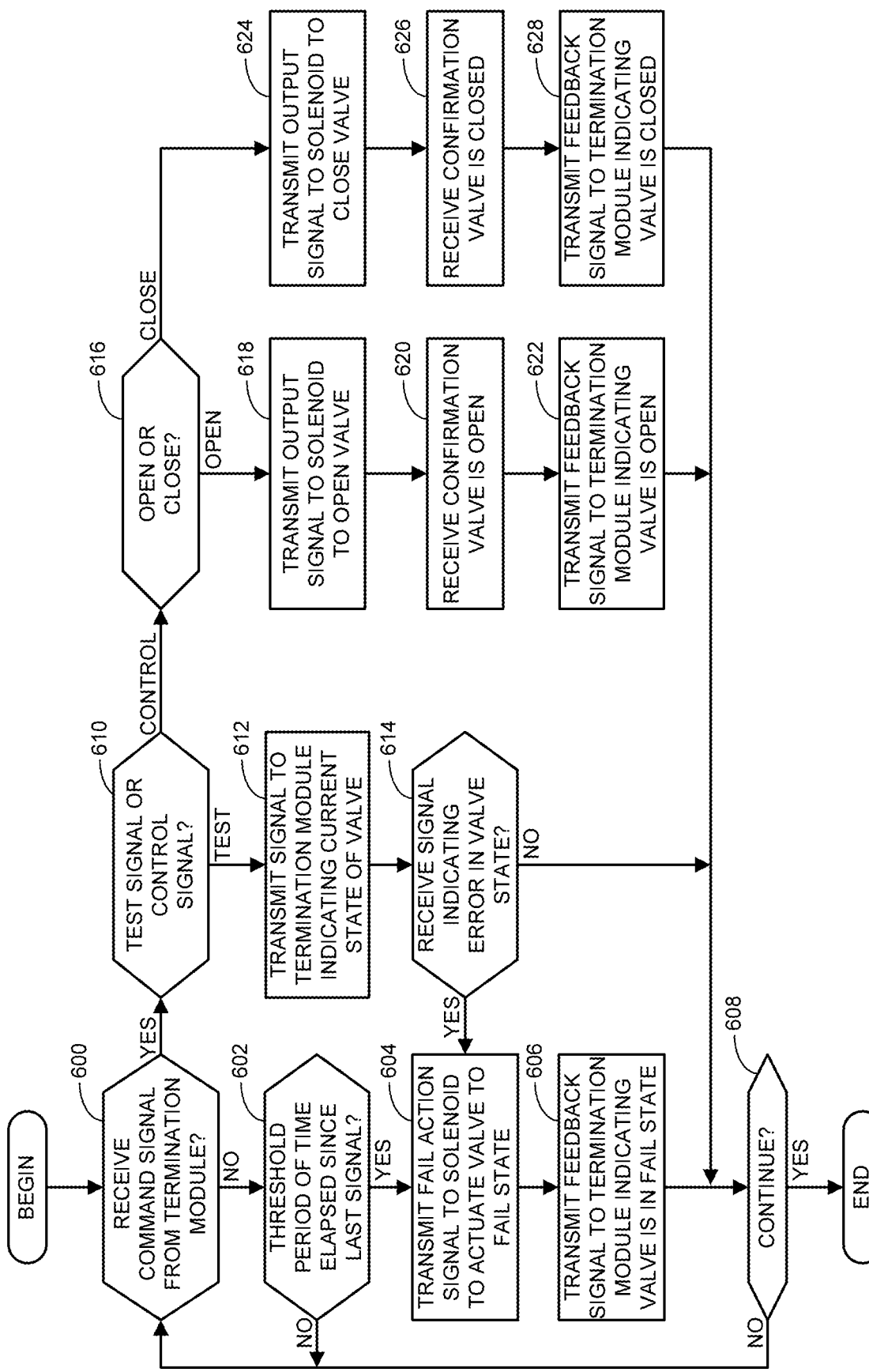
FIG. 6 is a flowchart of an example method that may be used to implement the multi-channel transceiver of FIGS. 2 and 4 in accordance with the teachings disclosed herein.

A flowchart representative of an example method for implementing the transceiver 230 of FIG. 4 is shown in FIG. 6. In this example, the method is implemented as machine readable instructions that comprise a program for execution by a processor such as the processor 712 shown in the example processor platform 700 discussed below in connection with FIG. 7. The program may be embodied in software stored on a tangible computer readable storage medium such as a CD-ROM, a floppy disk, a hard drive, a digital versatile disk (DVD), a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowchart illustrated in FIG. 7, many other methods of implementing the example transceiver 230 may alternatively be used. For example, the order of execution of the blocks may be changed, and/or some of the blocks described may be changed, eliminated, or combined.

Turning in detail to FIG. 6, the example process begins at block 600 where the example transceiver 230 determines whether it has received a command signal from a termination module (e.g., the termination module 124a of FIG. 2). For example, the transceiver 230 determines that it has received a signal if the communication processor 408 indicates via, for example, an interrupt or a status register that a signal has been received. In some examples, the signal corresponds to the signals transmitted at any of blocks 504, 510, 518, or 528 of FIG. 5. If no signal is received, the operation controller 410 determines whether a threshold period of time has elapsed since the last signal was received (block 602). If the operation controller 410 determines that the threshold period of time has not elapsed (block 602), control returns to block 600. If the operation controller 410 determines that the threshold period of time has elapsed since the last signal (block 602), control advances to block 604 where the example communication processor 408 transmits (e.g., via the solenoid interface 404) a fail action signal to the solenoid 210 to actuate the on/off valve 202 to a fail state. At block 606, the example communication processor 408 transmits (e.g., via the termination module interface 402) a feedback signal to the termination module 124a indicating the on/off valve 202 is in the fail state. At block 608, the example operation controller 410 determines whether to continue the example process. If so, control returns to block 600. Otherwise, the example process of FIG. 6 ends.

Returning to block 600, if the example transceiver 230 determines that it has received a command signal from the termination module 214a, control advances to block 610. At block 610, the example communication processor 408 determines whether the signal is a test signal (e.g., to check the operational state of the on/off valve 202) or a control signal (e.g., to drive the on/off valve 202 to an open state or a closed state). If the example communication processor 408 determines that the signal is a test signal, the example communication processor 408 transmits a signal to the termination module 124a indicating the current state of the on/off valve 202 (block 612). In some examples, the current state of the on/off valve 202 is retrieved by the communication processor 408 via the proximity sensor interface 406 based on discrete input signals generated by the proximity sensors in the switch box 212. In other examples, the example communication processor 408 stores the current state of the on/off valve 202 when initially changed as indicated by the feedback from the proximity sensors until requested via a test signal or changed via a new control signal. After the communication processor 408 transmits the signal indicating the current state of the on/off valve 202 (block 612), the example transceiver 230 determines whether a signal indicating an error in the valve state is received (block 614). A signal indicating an error in the valve state may be received if the termination module 124a determines that the current valve state reported by the transceiver 230 does not match the last control signal transmitted to the transceiver. In some examples, the transceiver 230 determines that it has received such a signal if the communication processor 408 indicates via, for example, an interrupt or a status register that a signal indicating an error has been received. In some examples, the signal indicating an error may correspond to the fail action signal transmitted at block 528 of FIG. 5. If the example transceiver 230 receives a signal indicating an error in the valve state (block 614), control advances to block 604 to transmit a fail action signal to the solenoid 210. If the example transceiver 230 does not receive a signal indicating an error in the valve state (block 614), control advances to block 608.

If the example operation controller 410 determines that the command signal is a control signal (block 610), control advances to block 616 where the example operation controller 410 determines whether the control signal is to open or close the on/off valve 202. If the example operation controller 410 determines that the control signal is to open the on/off valve 202 (block 616), the example communication processor 408 transmits (e.g., via the solenoid interface 404) an output signal to the solenoid 210 to open the on/off valve 202 (block 618). At block 620, the example communication processor 408 receives confirmation (e.g., via the proximity sensor interface 406) that the on/off valve 202 is open. At block 622, the example communication processor 408 transmits (e.g., via the termination module interface 402) a feedback signal to the termination module 124a indicating the on/off valve 202 is open. Control then advances to block 608.

If the example operation controller 410 determines that the control signal is to close the on/off valve 202 (block 616), the example communication processor 408 transmits (e.g., via the solenoid interface 404) an output signal to the solenoid 210 to close the on/off valve 202 (block 624). At block 626, the example communication processor 408 receives (e.g., via the proximity sensor interface 406) confirmation that the on/off valve 202 is closed. At block 628, the example communication processor 408 transmits (e.g., via the termination module interface 402) a feedback signal to the termination module 124a indicating the on/off valve 202 is closed. Control then advances to block 608.

As mentioned above, the example processes of FIGS. 5 and 6 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 5 and 6 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 7:
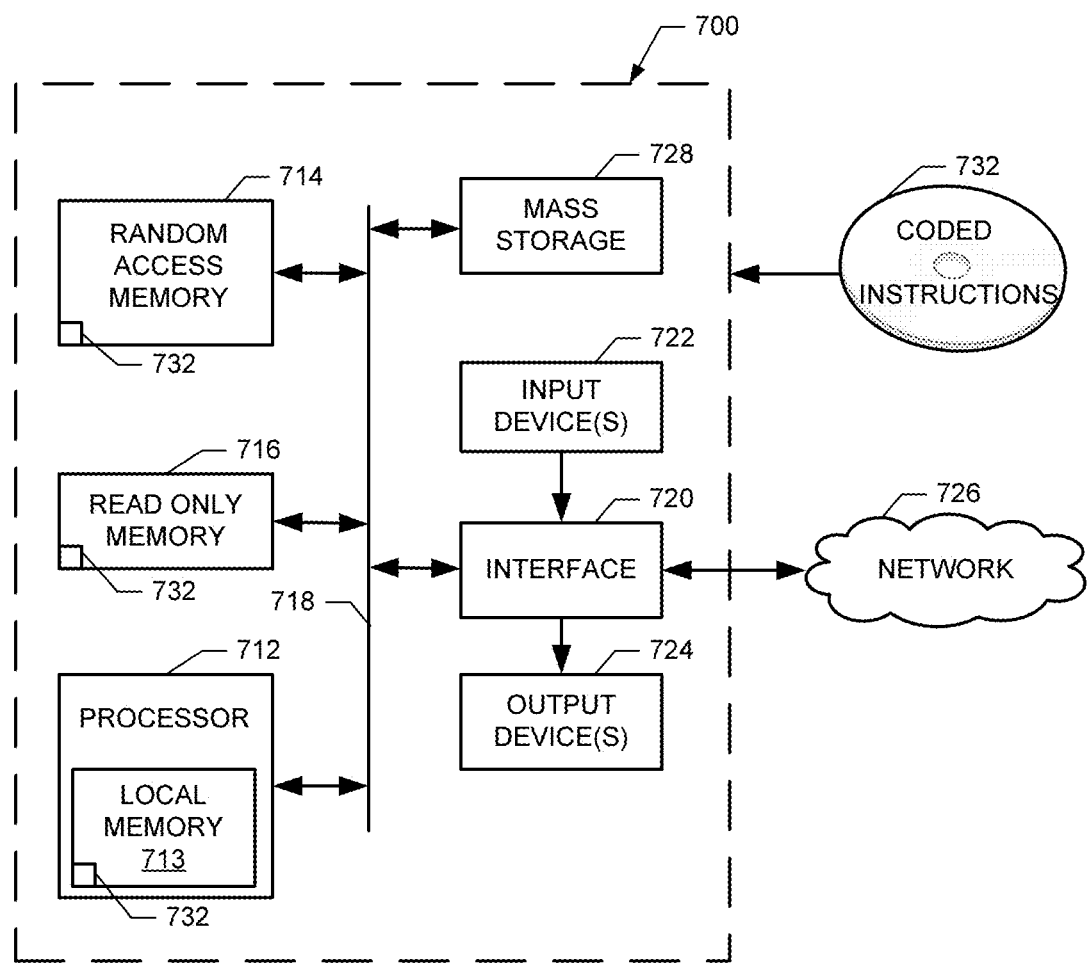
FIG. 7 is a schematic illustration of an example processor platform that may be used and/or programmed to carry out the example methods of FIGS. 5 and 6, and/or more generally, to implement the example termination module of FIG. 3 and/or to implement the example multi-channel transceiver of FIG. 4.

FIG. 7 is a block diagram of an example processor platform 700 capable of executing instructions to perform the methods of FIGS. 5 and 6 to implement the termination module 124a of FIG. 3 and/or the transceiver 230 of FIG. 4. The processor platform 700 can be, for example, a server, a personal computer, an Internet appliance, or any other type of computing device.

The processor platform 700 of the illustrated example includes a processor 712. The processor 712 of the illustrated example is hardware. For example, the processor 712 can be implemented by one or more integrated circuits, logic circuits, microprocessors or controllers from any desired family or manufacturer.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), and/or a PCI express interface.

In the illustrated example, one or more input devices 722 are connected to the interface circuit 720. The input device(s) 722 permit(s) a user to enter data and commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 720 of the illustrated example, thus, typically includes a graphics driver card, a graphics driver chip or a graphics driver processor.

The interface circuit 720 of the illustrated example also includes a communication device such as a transmitter, a receiver, a transceiver, a modem and/or network interface card to facilitate exchange of data with external machines (e.g., computing devices of any kind) via a network 726 (e.g., an Ethernet connection, a digital subscriber line (DSL), a telephone line, coaxial cable, a cellular telephone system, etc.).

The processor platform 700 of the illustrated example also includes one or more mass storage devices 728 for storing software and/or data. Examples of such mass storage devices 728 include floppy disk drives, hard drive disks, compact disk drives, Blu-ray disk drives, RAID systems, and digital versatile disk (DVD) drives.

Coded instructions 732 to implement the methods of FIGS. 5 and 6 may be stored in the mass storage device 728, in the volatile memory 714, in the non-volatile memory 716, and/or on a removable tangible computer readable storage medium such as a CD or DVD.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A transceiver to enable communications between a controller and an on/off valve assembly in a process control system exclusively via a single pair of twisted wires, the on/off valve assembly including a main on/off valve, a solenoid to actuate the main on/off valve, and first and second proximity sensors to monitor a state of the main on/off valve, the on/off valve assembly to operate based on communications over three separate discrete I/O channels including (1) a discrete output channel for communication with the solenoid, (2) a first discrete input channel for communication with the first proximity sensor, and (3) a second discrete input channel for communication with the second proximity sensor, the transceiver comprising:

a housing separate from the on/off valve assembly;

a termination module interface carried by the housing, the termination module interface to electrically connect to a first end of the single pair of twisted wires, the termination module interface to receive, over the single pair of twisted wires, a discrete output control signal from the controller via a termination module electrically connected to a second end of the single pair of twisted wires, the termination module to enable communications between the termination module interface and the controller, the discrete output control signal directed to the discrete output channel of the on/off valve assembly, the termination module interface to transmit, over the single pair of twisted wires, a feedback signal to the controller via the termination module in response to the discrete output control signal;

a proximity sensor interface carried by the housing, the proximity sensor interface including:

a first wire to electrically connect exclusively to the first proximity sensor to enable communications over the first discrete input channel, the proximity sensor interface to receive a first discrete output of the first proximity sensor over the first discrete input channel via the first wire, the first discrete output to indicate when the main on/off valve is in an open state; and a second wire, separate from the first wire, to electrically connect exclusively to the second proximity sensor to enable communications over the second discrete input channel, the proximity sensor interface to receive a second discrete output of the second proximity sensor over the second discrete input channel via the second wire, the second discrete output to indicate when the main on/off valve is in a closed state, the feedback signal based on the at least one of the first discrete output or the second discrete output; and a communication processor carried by the housing, the communication processor to enable communications between the termination module interface and the proximity sensor interface and to process the control signal and the feedback signal.

2. The transceiver of claim 1, wherein the discrete output control signal is to drive the main on/off valve to one of the open state or the closed state.

3. The transceiver of claim 2, further comprising a solenoid interface to transmit the discrete output control signal to the solenoid to actuate the main on/off valve.

4. The transceiver of claim 1, wherein the housing is to be physically coupled to the on/off valve assembly.

5. The transceiver of claim 1, further including a solenoid interface including a third wire to connect to the solenoid, the third wire to enable communications over the discrete output channel, the solenoid interface to transmit the discrete output control signal to the solenoid over the third wire to actuate the main on/off valve.

6. A method, comprising:
receiving, by a termination module interface of a transceiver, a discrete output control signal from a termination module, the discrete output control signal received over a single pair of twisted wires electrically connected to both the termination module and the termination module interface, the termination module to enable communications between the transceiver and a controller in a process control system, the discrete output control signal provided by the controller and directed to a discrete output channel of an on/off valve assembly in the process control system, the on/off valve assembly to operate based on communications over three separate discrete I/O channels, the three separate discrete I/O channels including (1) the discrete output channel for communication with a solenoid of the on/off valve assembly, (2) a first discrete input channel for communication with a first proximity sensor of the on/off valve assembly, and (3) a second discrete input channel for communication with a second proximity sensor of the on/off valve assembly, the termination module interface contained in a housing of the transceiver physically coupled to the on/off valve assembly;

receiving, by a proximity sensor interface of the transceiver, a first discrete output of the first proximity sensor over the first discrete input channel, the first discrete output to indicate when a main on/off valve of the on/off valve assembly is in an open state, the proximity sensor interface including a first wire to electrically connect exclusively to the first proximity sensor to enable communications over the first discrete input channel, the first discrete output to be received via the first wire;

receiving, by the proximity sensor interface of the transceiver, a second discrete output of the second proximity sensor over the second discrete input channel, the second discrete output to indicate when the main on/off valve is in a closed state, the proximity sensor interface including a second wire to electrically connect exclusively to the second proximity sensor to enable communications over the second discrete input channel, the second discrete output to be received via the second wire; and transmitting, over the single pair of twisted wires via the termination module interface, a feedback signal to the controller via the termination module in response to the discrete output control signal, the feedback signal generated based on the at least one of the first discrete output or the second discrete output.

7. The method of claim 6, wherein the discrete output control signal is to drive the main on/off valve to one of the open state or the closed state.

8. The method of claim 7, further comprising transmitting the discrete output control signal to the solenoid to actuate the main on/off valve.

9. A tangible machine readable storage medium having instructions stored thereon, which when executed, cause a transceiver to at least:
process a discrete output control signal transmitted from a termination module over a single pair of twisted wires electrically connected to the termination module and to a termination module interface of the transceiver, the termination module to enable communications between the transceiver and a controller in a process control system, the discrete output control signal provided by the controller and directed to a discrete output channel of an on/off valve assembly in the process control system, the on/off valve assembly to operate based on communications over three separate discrete I/O channels, the three separate discrete I/O channels including (1) the discrete output channel for communication with a solenoid of the on/off valve assembly, (2) a first discrete input channel for communication with a first proximity sensor of the on/off valve assembly, and (3) a second discrete input channel for communication with a second proximity sensor of the on/off valve assembly;

process a first discrete output of the first proximity sensor over the first discrete input channel, the first discrete output to indicate when a main on/off valve of the on/off valve assembly is in an open state, the transceiver including a proximity sensor interface including a first wire to electrically connect exclusively to the first proximity sensor to enable communications over the first discrete input channel, the first discrete output to be received via the first wire;

process a second discrete output of the second proximity sensor over the second discrete input channel, the second discrete output to indicate when the main on/off valve is in a closed state, the proximity sensor interface including a second wire to electrically connect exclusively to the second proximity sensor to enable communications over the second discrete input channel, the second discrete output to be received via the second wire; and transmit, over the single pair of twisted wires, a feedback signal to the controller via the termination module in response to the discrete output control signal, the feedback signal generated based on the at least one of the first discrete output or the second discrete output.

10. The storage medium of claim 9, wherein the discrete output control signal is to drive the main on/off valve to one of the open state or the closed state.

11. The storage medium of claim 10, wherein the instructions, when executed, further cause the transceiver to transmit the discrete output control signal to the solenoid to actuate the main on/off valve.

* * * * *